(12) United States Patent
Frazier et al.

(10) Patent No.: US 8,396,424 B2
(45) Date of Patent: Mar. 12, 2013

(54) METHOD AND APPARATUS FOR PERFORMING ROLE MANAGEMENT OF SHORT-RANGE WIRELESS CONNECTIONS

(75) Inventors: Taneka L. Frazier, Lilburn, GA (US); Juda Xiong, Lawrenceville, GA (US)

(73) Assignee: Motorola Mobility LLC, Libertyville, IL (US)

( * ) Notice: Subject to any disclaimer, the term of this patent is extended or adjusted under 35 U.S.C. 154(b) by 95 days.

(21) Appl. No.: 13/116,531

(22) Filed: May 26, 2011

(65) Prior Publication Data
US 2012/0302170 A1  Nov. 29, 2012

(51) Int. Cl.
*H04B 7/00* (2006.01)
(52) U.S. Cl. ............ 455/41.2; 455/3.06; 455/151.2; 455/433; 370/278
(58) Field of Classification Search ............ 455/41.2, 455/3.06, 151.2, 443, 414.1, 418, 419; 370/278, 370/252
See application file for complete search history.

(56) References Cited

U.S. PATENT DOCUMENTS

| | | | |
|---|---|---|---|
| 6,954,438 B2 * | 10/2005 | Morley et al. | 370/278 |
| 7,454,171 B2 | 11/2008 | Palin et al. | |
| 7,515,897 B2 * | 4/2009 | Suzuki | 455/343.2 |
| 7,574,174 B2 * | 8/2009 | Heinonen et al. | 455/41.2 |
| 7,929,912 B2 * | 4/2011 | Sherman | 455/41.2 |
| 8,204,230 B2 * | 6/2012 | Schmidt et al. | 380/278 |
| 2002/0145980 A1 | 10/2002 | Morley et al. | |
| 2003/0054821 A1 * | 3/2003 | Kita et al. | 455/435 |
| 2005/0286466 A1 * | 12/2005 | Tagg et al. | 370/329 |
| 2006/0072525 A1 | 4/2006 | Hillyard et al. | |
| 2008/0242365 A1 | 10/2008 | Rokusek | |
| 2008/0267147 A1 | 10/2008 | Niranjan et al. | |
| 2010/0077105 A1 | 3/2010 | Chung | |
| 2010/0312826 A1 * | 12/2010 | Sarosi et al. | 709/203 |

FOREIGN PATENT DOCUMENTS

| | | |
|---|---|---|
| WO | 0197455 A1 | 12/2001 |
| WO | 02052793 A1 | 7/2002 |
| WO | 2006011077 A1 | 2/2006 |

OTHER PUBLICATIONS

Patent Cooperation Treaty, International Search Report and Written Opinion of the International Searching Authority for International Application No. PCT/US2012/035942, Aug. 31, 2012, 12 pages.
John Oberpriller, et al., Topology Management Core Features Requirements Document, Version V10r00, Jul. 11, 2007, Bluetooth SIG, Inc., pp. 1-6.

* cited by examiner

*Primary Examiner* — Minh D Dao (57) ABSTRACT

A first wireless device is operable to perform role management of short-range wireless connections with other wireless devices over short-range wireless links that utilize a short-range wireless protocol, such as the Bluetooth protocol. According to one embodiment, the first wireless device accepts a request from a second wireless device to establish a connection over a short-range wireless link such that the first wireless device temporarily performs a slave role with respect to the connection. Responsive to establishing the connection, the first wireless device initiates a disconnect of the connection and then communicates a new request to the second wireless device to establish a new connection. Upon receiving an acceptance of the new request from the second wireless device, the first wireless device establishes the new connection over the short-range wireless link such that the first device performs a master role with respect to the new connection.

18 Claims, 5 Drawing Sheets

METHOD AND APPARATUS FOR PERFORMING ROLE MANAGEMENT OF SHORT-RANGE WIRELESS CONNECTIONS

FIELD OF THE INVENTION

The present invention relates generally to wireless devices that are capable of supporting multiple, simultaneous, short-range connections and, more particularly, to a method and apparatus for performing role management of short-range wireless connections.

BACKGROUND

Short-range wireless communication technologies are well-known for use in wireless personal area networks (WPANs). Such technologies include, but are not limited to, Bluetooth®, wireless Universal Serial Bus (Wireless USB), Wi-Fi®, Z-Wave®, ZigBee®, and IrDA®. Of these technologies, the use of Bluetooth technology is most prevalent for WPANs involving short-range communications between wireless accessory devices and wireless wide area network (WWAN) devices, such as cellular phones, smartphones, laptop computers, tablet computers, and personal digital assistants (PDAs).

As discussed in detail in U.S. Patent Application Publication No. US 2006/0072525 A1, Bluetooth wireless technology is an international, open standard for allowing intelligent devices to communicate with each other through wireless, short-range communications. Bluetooth technology allows any Bluetooth-enabled device, such as a computer, smartphone, keyboard, printer, or hands-free device (e.g., a headset or earpiece), to make its own wireless connections to other Bluetooth-enabled devices without any direct action from a user.

Bluetooth wireless technology enables multiple simultaneous connections between Bluetooth-enabled devices. For example, a Bluetooth-enabled computer (e.g., a personal computer, laptop computer, or tablet computer) may be connected to a Bluetooth printer and a Bluetooth mouse. As another example, a Bluetooth-enabled palmtop computer with MP3 functionality, such as an iPod Touch® device, may be connected to a Bluetooth headset and a Bluetooth speaker. Additionally, certain Bluetooth devices, such as audio gateways, facilitate connection of other Bluetooth devices to devices that are not Bluetooth-enabled. For example, a Bluetooth audio gateway may be used to connect a Bluetooth-enabled cellular phone to a cordless telephone base station to allow incoming cellular phone calls to be answered using a home's cordless telephones. Alternatively, a Bluetooth audio gateway may be embedded into cellular or smartphone to facilitate communications between a Bluetooth headset and a cellular network.

When two or more complex Bluetooth-enabled devices wirelessly connect together, they form a network that is typically referred to as a "piconet." Each device in a Bluetooth piconet may be characterized by a role, such as a master role or a slave role, with respect to the audio and/or data connections in the piconet. According to the Bluetooth specification, there may be one piconet master device and up to seven piconet slave devices. Additionally according to the Bluetooth specification, a device that initiates a Bluetooth connection is deemed to be the default master device and a device that accepts a connection is deemed to be a default slave device.

Bluetooth devices may operate in more than one piconet and, therefore, may simultaneously perform one or more roles with respect to the audio and/or data connections in the various piconets. For example, a Bluetooth device may operate as a master in a first piconet and as a slave in a second piconet, as a slave in both piconets, or as a master in both piconets, depending on how the Bluetooth connections originated in the piconets. A Bluetooth device's simultaneous participation as a master or slave in one piconet and a slave in another piconet is typically referred to as involvement in a "scatternet." Scatternet operation is supported by some, but not all, Bluetooth chipsets, and some Bluetooth chipsets have better scatternet support than others. In this regard, some Bluetooth chipsets are adapted to support master and slave operating modes, but others are adapted to support only master or only slave operating modes.

During operation of connected Bluetooth devices, one or more roles of the devices may be switched if the Bluetooth devices support role switching. For example, one or more roles may be switched upon connection of an additional Bluetooth device to an existing piconet of Bluetooth devices. Role switching is often necessary and may even be required in certain circumstances. For example, a Bluetooth network access point may require all peer devices to be slaves and initiate a role switch whenever a connection is attempted. However, not all Bluetooth devices support role switching and either unsupported role switching or improperly managed role switching may cause an unsupported scatternet scenario. Such a scenario may result in rejection of a new Bluetooth connection request and/or abnormal dropping of one or more existing Bluetooth links due to unsupported role profiles and/or unauthorized role switching requests within a conventional piconet of Bluetooth devices. The likelihood of abnormal link dropping or loss typically increases in situations where a Bluetooth device with unsupported or poorly managed role switching is connected in a slave role to one Bluetooth audio gateway and then attempts to simultaneously connect to another Bluetooth audio gateway in a default master role. The increased risk of link loss is generally due to the link management requirements imposed upon the device when acting in the role of slave interfering with the audio transmission requirements of the device when acting as a master.

Managing of device roles and role switching may help reduce the likelihood of creating an unsupported scatternet scenario. One technique for managing the switching of roles between Bluetooth devices is described in U.S. Patent Application Publication No. US 2006/0072525 A1, which is incorporated herein by this reference. According to the technique disclosed in the publication, a Bluetooth device that supports role switching and receives a new connection request determines whether to switch from a current role (which would be a slave role by default) to another role (e.g., master) based on a stored role management table. The role management table may include desired roles based on the type of application as specified by a particular Bluetooth profile (e.g., advanced audio distribution profile (A2DP), general access profile (GAP), generic audio/visual distribution profile (GAVDP), and so forth).

However, even in scenarios where role switching is well managed, abnormal link loss may still occur. For example, according to the Bluetooth specification, a Bluetooth audio gateway (e.g., in a cellular phone or smartphone) can request to become a piconet master and a Bluetooth accessory (e.g., a hands-free device) is obligated to accept the request, resulting in the accessory becoming a slave. The accessory can then subsequently request to become a master due to establishing another Bluetooth connection, but not all audio gateways (e.g., those in certain cellular phones and smartphones) permit role switching to a slave role. Therefore, where the accessory's request to role switch is refused, the accessory remains in the slave role, which results in a scatternet scenario and an increased risk for abnormal link loss if the accessory attempts to connect to another audio gateway (e.g., in another cellular phone or smartphone).

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various embodiments of the present invention.

DETAILED DESCRIPTION

Generally, the present invention encompasses a method and apparatus for performing role management of short-range wireless connections. According to one embodiment, a first wireless device accepts a request from a second wireless device to establish a connection over a short-range wireless link such that the first wireless device temporarily performs a slave role with respect to the connection. The short-range wireless link utilizes a short-range wireless protocol, such as the Bluetooth protocol. Responsive to establishing the connection, the first wireless device initiates a disconnect of the connection and then communicates a new request to the second wireless device to establish a new connection. Upon receiving an acceptance of the new request from the second wireless device, the first wireless device establishes the new connection over the short-range wireless link such that the first device performs a master role with respect to the new connection. In one embodiment where the short-range wireless link supports communication of audio between the first and second wireless devices, the disconnect of the original connection may be initiated prior to communication of audio between the devices.

Additionally or alternatively, where the first wireless device supports role switching with respect to connections involving the first wireless device (e.g., such as permitted under the Bluetooth specification), the first wireless device may disable its role switching functionality prior to accepting the second wireless device's request to establish a connection over the short-range wireless link. When Bluetooth technology is used as the short-range wireless protocol, disablement of role switching functionality allows the first wireless device's role in wireless connections to be defined solely according to whether the first device requested or accepted a connection. According to default parameters of the Bluetooth specification, the device that initiates or requests a connection performs the master role with respect to the connection and the device that accepts a requested connection performs a slave role with respect to the connection. Slave role requirements may include periodically monitoring the quality of the short-range wireless link or other parameters associated with the connection and reporting the monitored parameters to the device performing the master role with respect to the connection.

In a further embodiment, the first wireless device may perform in a master role in a separate wireless connection with a third wireless device over another short-range wireless link that supports the same short-range protocol as is being used for the connection between the first and second wireless devices. For example, the first wireless device may be a hands-free device, such as a Bluetooth headset, and be in communication with a second wireless device, such as a smartphone, and a third wireless device, such as an iPod Touch, over separate Bluetooth links. The first wireless device may have engaged with the third wireless device prior to the first device's acceptance of the original connection request from the second wireless device. In such a case, the first wireless device may have either initiated the connection so as to perform the master role by default (e.g., as provided in the Bluetooth specification) or accepted a connection request from the third device and then executed role switching functionality to switch its role from slave to master prior acceptance of the connection request from the second device (and prior to disabling role switching functionality). Alternatively, the first wireless device may have initiated the connection with the third wireless device and became default master after the first device had disabled role switching functionality and optionally after the first device established the new connection with the second device as master of the new connection. The connections between the first wireless device and the second and third wireless devices may be in the same short-range coverage area (e.g., a piconet) or in different short-range coverage areas (e.g., overlapping piconets).

In an alternative embodiment, a first wireless device executes a method for performing role management of short-range wireless connections involving the first wireless device. According to this embodiment, the first wireless device engages in a first connection with a second wireless device over a first short-range wireless link such that the first wireless device performs a master role with respect to the first connection. The first short-range wireless link supports a short-range wireless protocol, and the first wireless device supports role switching with respect to short-range wireless connections. Prior to accepting a request to establish a second connection with a third wireless device over a second short-range wireless link that also supports the short-range wireless protocol, the first wireless device disables its role switching functionality such that the first wireless device does not switch from the master role to a slave role with respect to the first connection. Thus, in this embodiment, the first wireless device disables role switching in order to insure that it does not attempt to change roles with respect to connections in which the first wireless device is in the master role. After role switching has been disabled, the first wireless device may accept the request from the third wireless device to establish the second connection over the second short-range wireless link such that the first wireless device temporarily performs a slave role with respect to the second connection. However, instead of changing roles with respect to the first connection, the first wireless device initiates a disconnect of the second connection responsive to establishing the second connection and prior to communication of audio between the first wireless device and the third wireless device over the second short-range wireless link. In order to essentially re-establish the disconnected connection previously requested by the third wireless device, the first wireless device communicates a second request to the third wireless device to establish a new connection over the second short-range wireless link and receives an acceptance of the second request from the third wireless device. After receiving the acceptance, the first wireless device establishes the new connection over the second short-range wireless link such that the first wireless device performs a master role with respect to the new connection.

In a further embodiment, a wireless device is provided that is operable to perform role management of short-range wireless connections involving the wireless device. According to this embodiment, the wireless device includes, inter alia, a transceiver, memory, and a processor. The transceiver is operable to support communications over a plurality of short-range wireless links, all of which support a common short-range wireless protocol, such as, for example, Bluetooth, Zigbee, Wi-Fi, or Z-Wave. The memory is operable to store wireless device operating instructions and optionally various other information as may be necessary to operate the wireless device. The processor is operably coupled to the transceiver and the memory, and operable in accordance with the wireless device operating instructions to perform various tasks associated with managing the wireless device's role in short-range wireless communications. Particularly, in accordance with this embodiment, the processor is operable to accept a request from a second wireless device to establish a connection over one of the short-range wireless links such that the processor temporarily performs a slave role with respect to the connection, initiate a disconnect of the connection responsive to establishing the connection, communicate a second request to the second wireless device to establish a new connection over the short-range wireless link, receive an acceptance of the second request from the second wireless device, and establish the new connection over the short-range wireless link such that the processor performs a master role with respect to the new connection. In one embodiment where the short-range wireless link supports communication of audio between the two wireless devices, the processor may be further operable to initiate the disconnect of the original connection prior to communication of any audio between the devices.

Additionally or alternatively, where the wireless device operating instructions include instructions to support role switching with respect to connections involving the wireless device (e.g., such as permitted under the Bluetooth specification), the processor may be further operable to disable the role switching functionality prior to accepting the second wireless device's request to establish a connection over the short-range wireless link. When Bluetooth technology is used as the short-range wireless protocol, disablement of role switching functionality allows the wireless device's role in wireless connections to be defined solely according to whether the device requested or accepted a connection.

In a further embodiment, another wireless device may perform in a master role in a separate wireless connection with a third wireless device over another short-range wireless link that supports the same short-range wireless protocol as is being used for the connection between the wireless device and the second wireless device. For example, the wireless device may be a hands-free accessory, such as a Bluetooth earpiece, for a wireless wide area network (WWAN) device, such as a cellular phone. The wireless device may be in communication with a second wireless device, such as the cellular phone, and a third wireless device, such as a laptop or tablet computer, over separate Bluetooth links. The wireless device may have engaged with the third wireless device prior to the wireless device's acceptance of the original connection request from the second wireless device. In that case, the wireless device may have either initiated the connection with the third wireless device so as to perform the master role by default (e.g., as provided in the Bluetooth specification) or accepted a connection request from the third device and then executed role switching functionality to switch its role from slave to master prior acceptance of the connection request from the second device (and prior to disabling role switching functionality). Alternatively, the wireless device may have initiated the connection with the third wireless device and became default master after the wireless device had disabled role switching functionality and optionally after the wireless device established the new connection with the second wireless device as master of the new connection. The connections between the wireless device and the second and third wireless devices may be in the same short-range coverage area (e.g., a piconet) or in different short-range coverage areas (e.g., overlapping piconets).

In a further embodiment, a wireless device is provided that is operable to perform role management of short-range wireless connections involving the wireless device. According to this embodiment, the wireless device includes, inter alia, a transceiver, memory, and a processor. The transceiver is operable to support communications over a plurality of short-range wireless links, all of which support a common short-range wireless protocol. The memory is operable to store wireless device operating instructions and optionally various other information as may be necessary to operate the wireless device. The processor is operably coupled to the transceiver and the memory, and operable in accordance with the wireless device operating instructions to perform various tasks associated with managing the wireless device's role in short-range wireless communications. Particularly, in accordance with this embodiment, the processor is operable to engage in a first connection with a second wireless device over a first short-range wireless link, such that the wireless device performs a master role with respect to the first connection. Additionally, the processor is operable to disable role switching functionality of the wireless device prior to accepting a request to establish a second connection with a third wireless device over a second short-range wireless link, such that the wireless device does not switch from the master role to a slave role with respect to the first connection.

In an alternative embodiment, the processor may be further operable to accept a request from a third wireless device to establish a second connection over a second short-range wireless link such that the processor temporarily performs a slave role with respect to the second connection and initiate a disconnect of the second connection responsive to establishing the second connection and prior to communication of audio between the wireless device and the third wireless device over the second short-range wireless link. The processor may then be operable to communicate a new request to the third wireless device to establish a new connection over the second short-range wireless link, receive an acceptance of the new request from the third wireless device, and establish the new connection over the second short-range wireless link such that the processor performs a master role with respect to the new connection.

By managing the role of a wireless device with respect to short-range communication connections in this manner, the present invention reduces the likelihood of creating an unsupported scatternet scenario involving the wireless device and the resulting increased risk of abnormal link loss associated therewith. Additionally, where the wireless device is an accessory for a WWAN device, such as a cellular phone, a smartphone, or a computer with a WWAN interface, keeping the accessory in a master role enables the accessory to participate in multiple short-range connections (e.g., multiple piconets) without incurring the additional current drain associated with periodic link management transmissions to other master devices. In this way, the accessory can dedicate its limited power to high quality communications (e.g., audio quality) between the accessory and the WWAN device it is supporting.

Figure 1:
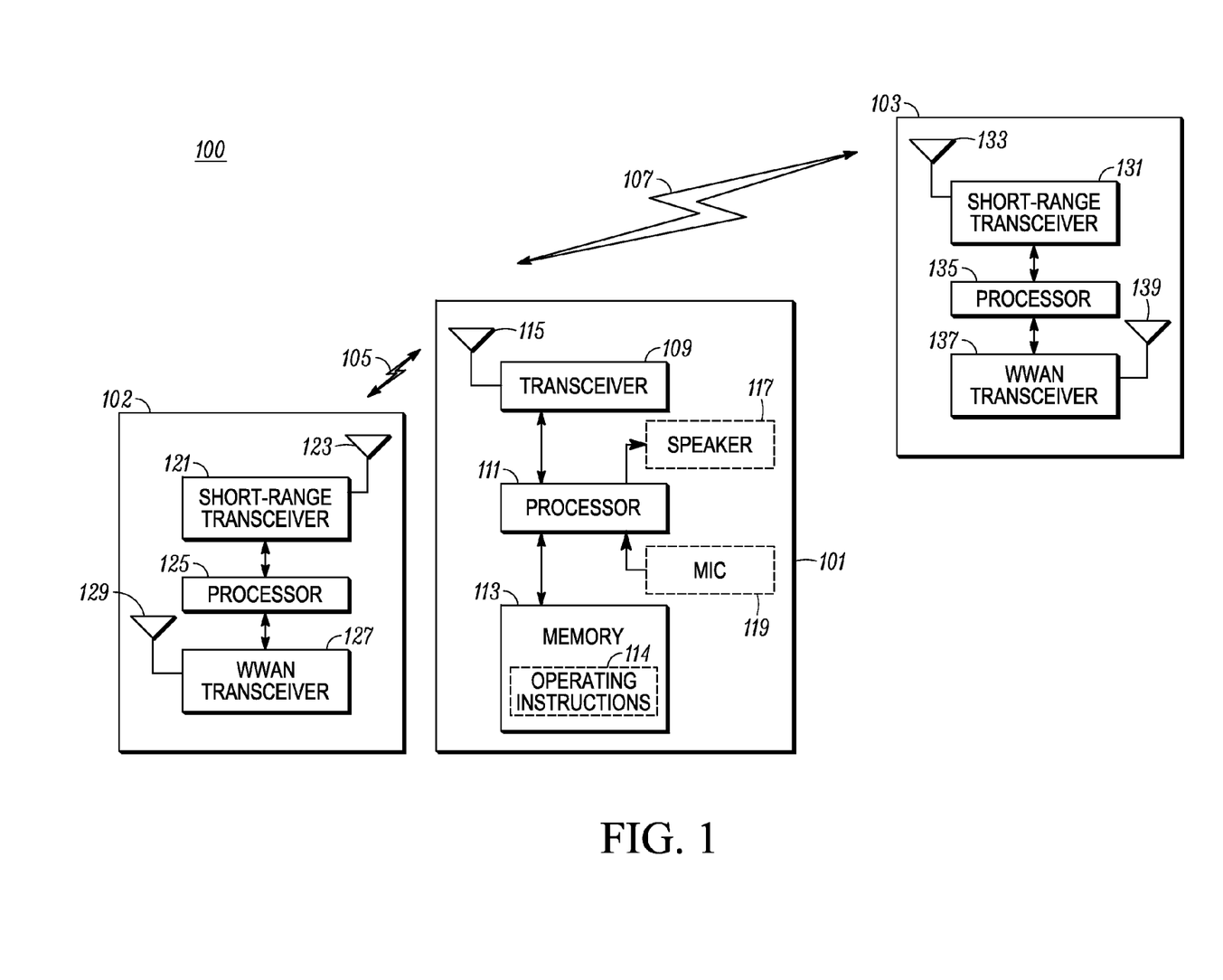
FIG. 1 is an electrical block diagram of a short-range wireless network that includes a wireless device operable to perform role management of short-range wireless connections involving the wireless device, in accordance with one exemplary embodiment of the present invention.

Embodiments of the present invention can be more readily understood with reference to FIGS. 1-5, in which like reference numerals designate like items. FIG. 1 is an electrical block diagram of a short-range wireless network 100 that includes a wireless device 101 operable to perform role management of short-range wireless connections involving the wireless device 101, in accordance with one exemplary embodiment of the present invention. The exemplary system 100 includes a plurality of wireless devices 101-103 that are capable of engaging in short-range wireless communications over short-range wireless links 105, 107. The wireless devices 101-103 may be any devices configured to engage in wireless communications using a short-range wireless protocol, such as, for example, Bluetooth, Z-Wave, ZigBee, Wi-Fi, IrDA, Wireless USB, Ultra Wide-Band (e.g., IEEE 802.15.4a standard), or any other current or future-developed wireless protocol intended for short-range wireless transmission (e.g., under 150 meters). For example, each wireless device 101-103 may be implemented as a two-way radio, a two-way pager, a wireless messaging device, a computer with integrated or accessory wireless communication functionality (e.g., laptop, notebook, netbook, tablet, handheld, or desktop computer or computing device), a wireless automotive gateway (e.g., for telematics), a wireless residential gateway, a server with integrated or accessory wireless communication functionality, a personal digital assistant (PDA), a wireless router, a cordless telephone, a wireless email device, a portable gaming device including a built-in wireless modem, a wireless communication card, a wireless headset, a wireless ear piece, wireless ear buds, a cordless headset, an in vehicle hands-free device, a wireless speakerphone, a sensory call notifier (non-audio device), a DECT™ headset, a voice over Internet Protocol (VoIP) headset, or any other wireless communication device that incorporates the functionality of the present invention.

According to the exemplary embodiment of FIG. 1, wireless device 101 includes, inter alia, an antenna 115, a transceiver 109 or other transmitting and receiving capability, a processor 111, and memory 113. Wireless device 101 may optionally include one or more speakers 117 (one shown) and one or more microphones 119 (one shown) when the wireless device 101 is implemented as a hands-free device or any other device facilitating audio communication. Wireless device 101 may also include a display, a power source (e.g., a battery), a battery-charging circuit, audio volume controls, and other conventional elements as are well understood in the art. Wireless device 101 may further include wide area communication functionality where the wireless device 101 is a multi-function device, such as a cellular phone, a smartphone or a computer.

The antenna 115, the transceiver 109, and the signal processing functions of the processor 111 are designed to implement and support a short-range wireless protocol operating to communicate digital information, such as audio, control information, and other data, between the wireless device 101 and two or more other wireless devices 102, 103 over short-range wireless links 105, 107. As is well understood by those skilled in the art, the transceiver 109 integrates both transmit and receive functionality. Alternatively, a separate transmitter and receiver (not shown) may be used in place of the transceiver 109. In accordance with one embodiment, the transceiver 109 may be configured to support simultaneous communications over two or more short-range wireless links 105, 107 supporting a common short-range wireless protocol.

The processor 111 is operably coupled to the transceiver 109, the memory 113, and, when included, the speaker 117 and the microphone 119. The processor 111 utilizes conventional signal-processing techniques for processing communication signals received over the short-range wireless links 105, 107 and intended for transmission over the short-range wireless links 105, 107. The processor 111 can be a microprocessor, a microcontroller, a digital signal processor (DSP), a state machine, logic circuitry, or any other device or combination of devices that processes information based on operational or programming instructions 114 stored in the memory 113. One of ordinary skill in the art will appreciate that the processor 111 may be implemented using multiple processors as may be required to handle the processing requirements of the present invention and the various other included functions of the wireless device 101. One of ordinary skill in the art will further recognize that when the processor 111 has one or more of its functions performed by a state machine or logic circuitry, the memory containing the corresponding operational instructions 114 may be embedded within the state machine or logic circuitry as opposed to being external to the processor 111 as illustrated in FIG. 1.

In the exemplary embodiment, the memory 113 stores, inter alia, one or more operating instructions 114 or applications (not shown) executed by the processor 111 during operation of the wireless device 101. In accordance with the present invention, the operating instructions 114 may include instructions for generating and processing data packets formatted in accordance with a short-range wireless protocol and performing role management with respect to short-range wireless connections involving the wireless device 101. The operating instructions for performing role management may include instructions to support role switching with respect to connections involving the wireless device 101, which instructions may be disabled in accordance with one or more embodiments of the present invention as disclosed in more detail below. The memory 113, which may be a separate element as depicted in FIG. 1 or integrated into the processor 111, can include random access memory (RAM), read-only memory (ROM), flash memory, electrically erasable programmable read-only memory (EEPROM), removable memory, and/or various other forms of memory as are well known in the art. It will be appreciated by one of ordinary skill in the art that the various memory components can each be a group of separately located memory areas in the overall or aggregate device memory and that the device memory may include one or more individual memory elements.

Wireless devices 102, 103 may be any wireless devices that are configured to include short-range communication functionality using a short-range protocol compatible with the short-range protocol implemented in wireless device 101. As illustrated in FIG. 1, wireless devices 102, 103 may be multi-function or multi-mode devices that provide short-range and wide area wireless communication capability. By way of example, but not limitation, each wireless device 102, 103 may be a Bluetooth-enabled cellular phone or smartphone, a Bluetooth-enabled computer with a WWAN (e.g., cellular) air card or modem, or a Bluetooth-enabled handheld computing device (e.g., an iPod Touch device) that further includes Wi-Fi functionality to provide wide area access through the Internet via a nearby wireless access point.

In the embodiment illustrated in FIG. 1, each wireless device 102, 103 respectively includes, inter alia, a short-range transceiver 121, 131 designed to implement and support the same short-range wireless protocol used in wireless device 101, a processor 125, 135, a WWAN transceiver 127, 137, an antenna 123, 133 to support short-range wireless transmissions, and at least one antenna 129, 139 (one shown) to support WWAN transmissions. The short-range transceivers 121, 131 and associated antennas 123, 133 may comprise conventional hardware and software for communicating control and user data, including voice communications, text, still images, graphics, and video, over the short-range wireless links 105, 107. Accordingly, the short-range transceivers 121, 131 may be Bluetooth transceivers or transceivers that support any other short-range wireless protocol used by wireless device 101.

The processors 125, 135 may utilize conventional signal-processing techniques for processing communication signals that are received over respective wide area wireless links or the short-range wireless links 105, 107, or that are intended for transmission over the respective wide area wireless links or the short-range wireless links 105, 107. Each processor 125, 135 may be a microprocessor, a microcontroller, a DSP, a state machine, logic circuitry, or any other device or combination of devices that processes information based on operational or programming instructions stored in device memory (not shown). One of ordinary skill in the art will appreciate that the processor 125, 135 can be implemented using multiple processors as may be required to handle the processing requirements of the present invention and the various other included functions of the respective wireless device 102, 103. One of ordinary skill in the art will further recognize that when the processor 125, 135 has one or more of its functions performed by a state machine or logic circuitry, the memory containing the corresponding operational instructions may be embedded within the state machine or logic circuitry as opposed to being external to the processor 125, 135. Depending on the wireless protocol(s) chosen for the wide area wireless system(s) in which wireless devices 102, 103 can operate, the WWAN transceivers 127, 137 and their associated antennas 129, 139 may support one or more wide area wireless communication protocols, such as WiMax (e.g., IEEE 802.16), CDMA, wideband CDMA (WCDMA), time division multiple access (TDMA), Global System for Mobile Communications (GSM), Enhanced Data GSM Environment (EDGE), General Packet Radio Service (GPRS), Universal Mobile Telecommunications Service (UMTS), frequency division multiple access (FDMA), orthogonal frequency division multiplexing (OFDM), High Speed Packet Access (HSPA), Long Term Evolution (LTE), spread spectrum, or any other known or future developed physical, access or link protocol or methodology.

Figure 2:
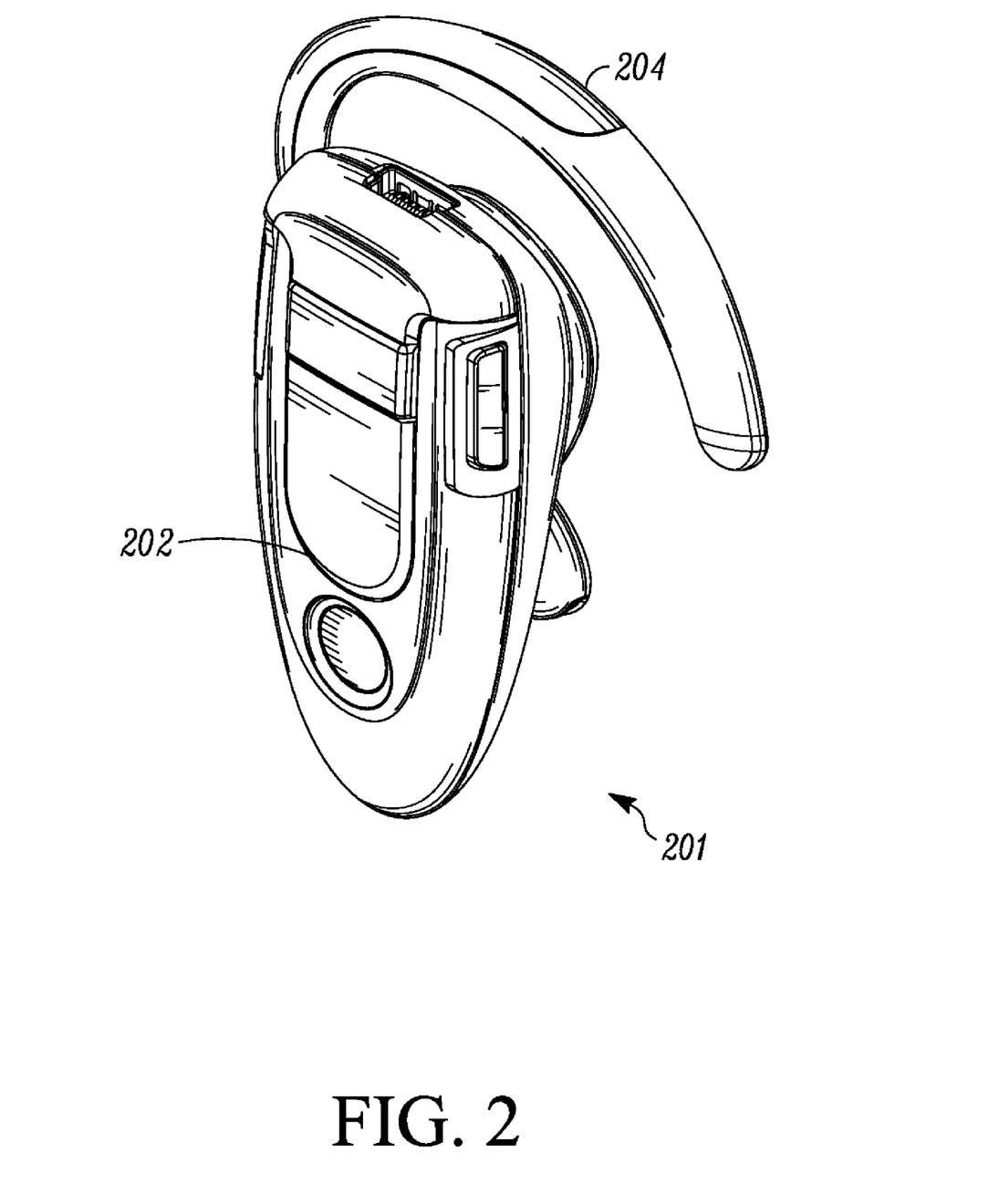
FIG. 2 is a perspective view of a hands-free device that may be used to implement the role-managing wireless device of FIG. 1.

In the exemplary embodiment illustrated in FIG. 1, wireless device 101 may be an accessory for two or more other wireless devices 102, 103 (two shown). For example, wireless device 101 may be a hands-free device and the other two wireless devices 102, 103 may be mobile or portable communication devices that include WWAN and short-range wireless communication capabilities. In one exemplary embodiment as illustrated in FIG. 2, wireless device 101 may be a hands-free earpiece 201 that includes a housing 202 connected to a curved member 204 for securing the housing 202 proximate the user's ear.

Figure 3:
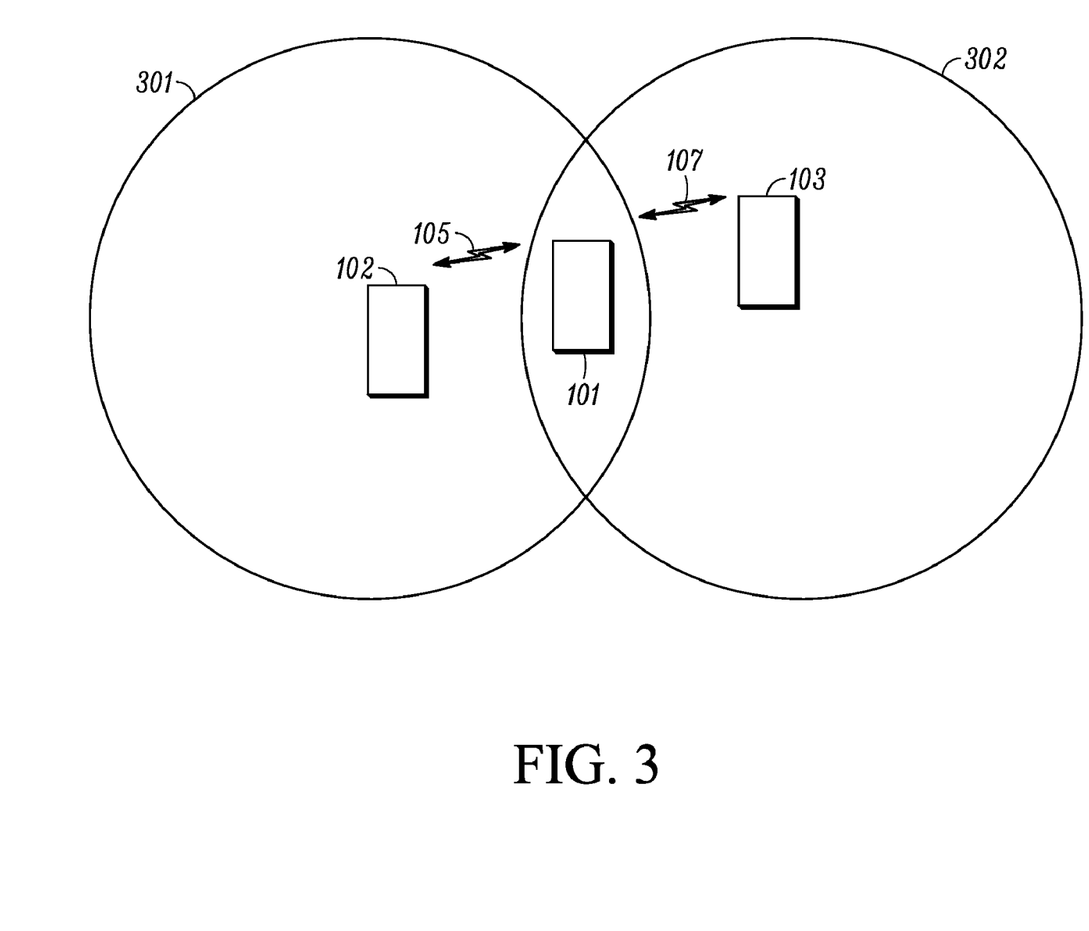
FIG. 3 is a block diagram of an arrangement of the wireless network of FIG. 1 in which the role-managing wireless device engages in connections with two other wireless devices over short-range wireless links and the connections are in different short-range coverage areas, in accordance with another exemplary embodiment of the present invention.

The wireless devices 101-103 may establish connections over the short-range wireless links 105, 107 in a single short-range coverage area or in different short-range coverage areas 301, 302, such as illustrated in FIG. 3. For example, a Bluetooth hands-free device (wireless device 101) may establish connections with a Bluetooth-enabled GSM smartphone (e.g., an iPhone®) and a Bluetooth-enabled CDMA smartphone (e.g., a Motorola DRIOD 2 smartphone) to provide hands-free operation for voice calls involving the smartphones (wireless devices 102, 103). Where the connections are established in different coverage areas 301, 302, one device 101 (e.g., the accessory device) may be located in a region in which the coverage areas 301, 302 overlap, such as illustrated in FIG. 3. In such a case, separate piconets may be established between the wireless device 101 and the two other wireless devices 102, 103 in accordance with operation of the present invention.

Figure 4:
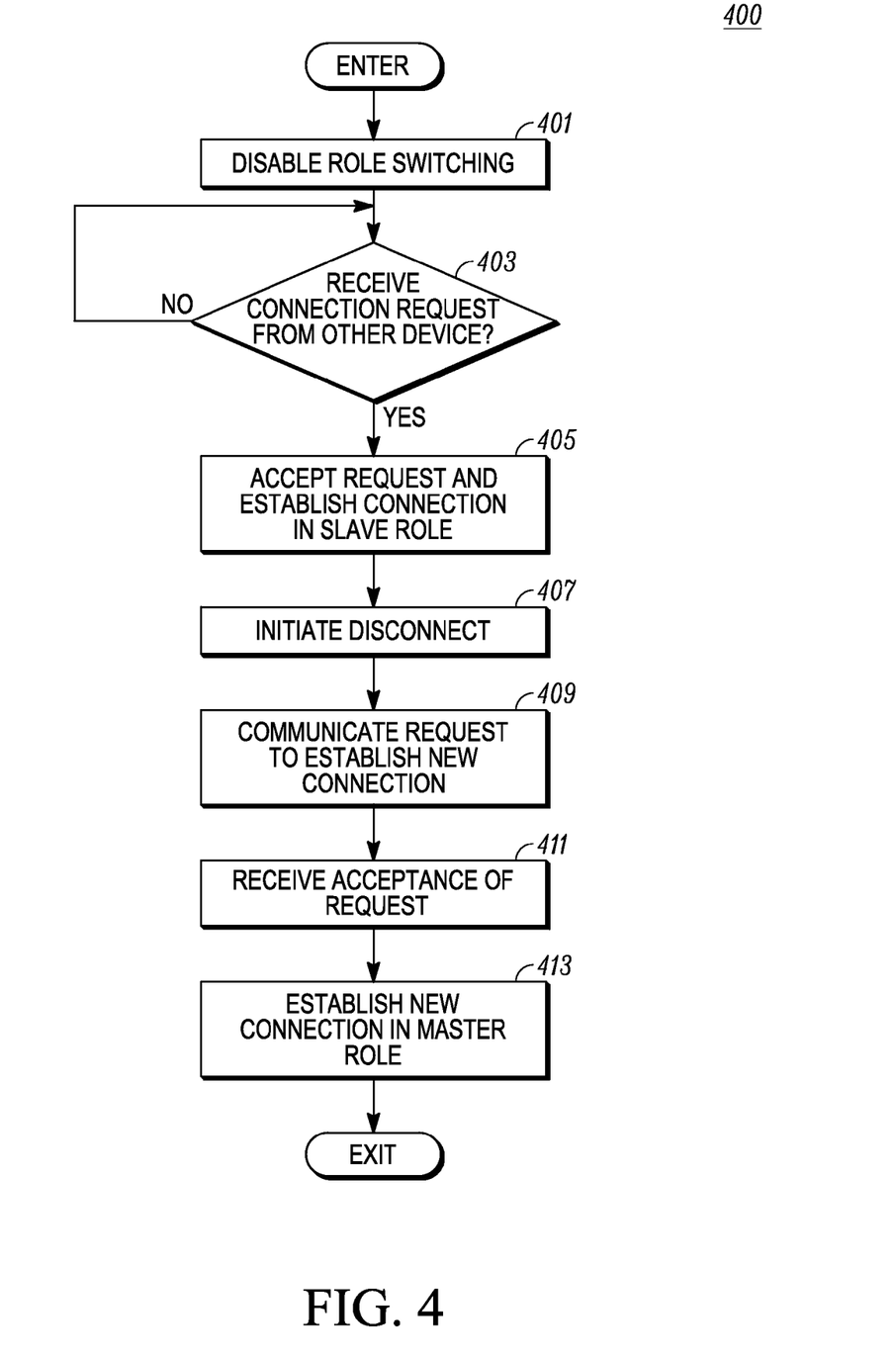
FIG. 4 is a logic flow diagram of steps executable by a wireless device to perform role management of short-range wireless connections involving the wireless device, in accordance with a further exemplary embodiment of the present invention.

Operation of a wireless device 101 to perform role management of its short-range wireless connections in accordance with one exemplary embodiment of the present invention may be better understood with respect to the logic flow diagram 400 of FIG. 4. The steps of the logic flow diagram 400 are preferably implemented as a set of operating instructions 114 (software) stored in memory 113 of a wireless device 101 and executed by one or more processors 111 of the wireless device 101. According to the logic flow, the wireless device 101 optionally, but preferably, disables (401) role switching functionality where the wireless device 101 is pre-programmed to support role switching with respect to short-range wireless connections involving the wireless device 101, such as where the wireless device 101 is a Bluetooth-enabled wireless device that supports role switching. Disabling of role switching prevents the wireless device 101 from performing a slave role throughout a connection established with another wireless device 102, 103, such as a cellular phone or smartphone which provides an audio gateway function. The disablement of role switching may occur prior to receipt of any connection request (e.g., at device turn on) or after the wireless device 101 has initiated a short-range wireless connection and is performing a master role with respect to the connection, but prior to receipt of a subsequent connection request.

In addition to disabling role switching, the wireless device 101 determines (403) whether it has received a connection request from another wireless device (e.g., wireless device 102) to establish a connection over a short-range wireless link (e.g., wireless link 105). If a connection request has been received, the wireless device 101 accepts (405) the request such that the wireless device 101 temporarily performs a slave role with respect to the connection. When the short-range wireless protocol used by the wireless devices 101-103 is a Bluetooth protocol, the wireless device's performance in the slave role occurs as a default so that the wireless device 101 can accept the connection request. As discussed above, under the Bluetooth protocol, the device that requests a connection performs the master role with respect to that connection by default.

After accepting the connection request and establishing the connection with the requesting wireless device 102, the wireless device 101 initiates (407) a disconnect of the connection and communicates (409) a new connection request to the wireless device 102 that had previously requested the now-disconnected connection. In other words, with respect to the exemplary embodiment of FIG. 1, wireless device 101 attempts to re-establish the prior connection with the previously requesting wireless device 102 as a new connection such that wireless device 101 performs in the default master role with respect to the new connection. The wireless device 101 preferably initiates a disconnect of the previously established connection prior to communication of audio, data or any other information over the short-range wireless link 105 between the connected wireless devices 101, 102. Alternatively, the wireless device 101 may initiate the disconnect after audio, data or other information has been communicated over the short-range wireless link 105; however, such an approach could cause a brief, undesired scatternet scenario. Such a scatternet may be more likely where the wireless device 101 was, prior to accepting the connection request from the previously requesting wireless device 102, performing in a master role (whether by default or as a result of role switching) in a connection with another wireless device (e.g., wireless device 103) over another short-range wireless link 107 that supports the same wireless protocol as the wireless link 105 used with the previously requesting wireless device 102. Additionally, where the wireless device 101 had disabled (401) role switching functionality prior to accepting (405) the connection request from the previously requesting wireless device 102, the disablement of role switching prevents switching of the wireless device 101 from the master role to a slave role with respect to an earlier connection between the wireless device 101 and another wireless device 103.

Some time after communicating the new connection request to the previously requesting wireless device 102, the wireless device 101 receives (411) acceptance of the new connection request from the target wireless device 102. As a result, the wireless device 101 establishes (413) the new connection with the previously requesting wireless device 102 over a short-range wireless link 105 such that the wireless device 101 performs the master role with respect to the new connection (e.g., wireless device 101 becomes the default master of the new connection according to the specification associated with the particular short-range wireless protocol). By proceeding through a connect/disconnect/reconnect procedure as described above, a wireless device 101 is able to control its function within established short-range wireless connections such that wireless device 101 maintains a master role in all of its connections. Such an approach reduces the likelihood of a scatternet scenario involving the wireless device 101, and its associated risk of abnormal link loss, as well as conserves battery power of the wireless device 101 by eliminating the link management transmission or reporting tasks normally assigned to devices operating in slave roles.

Figure 5:
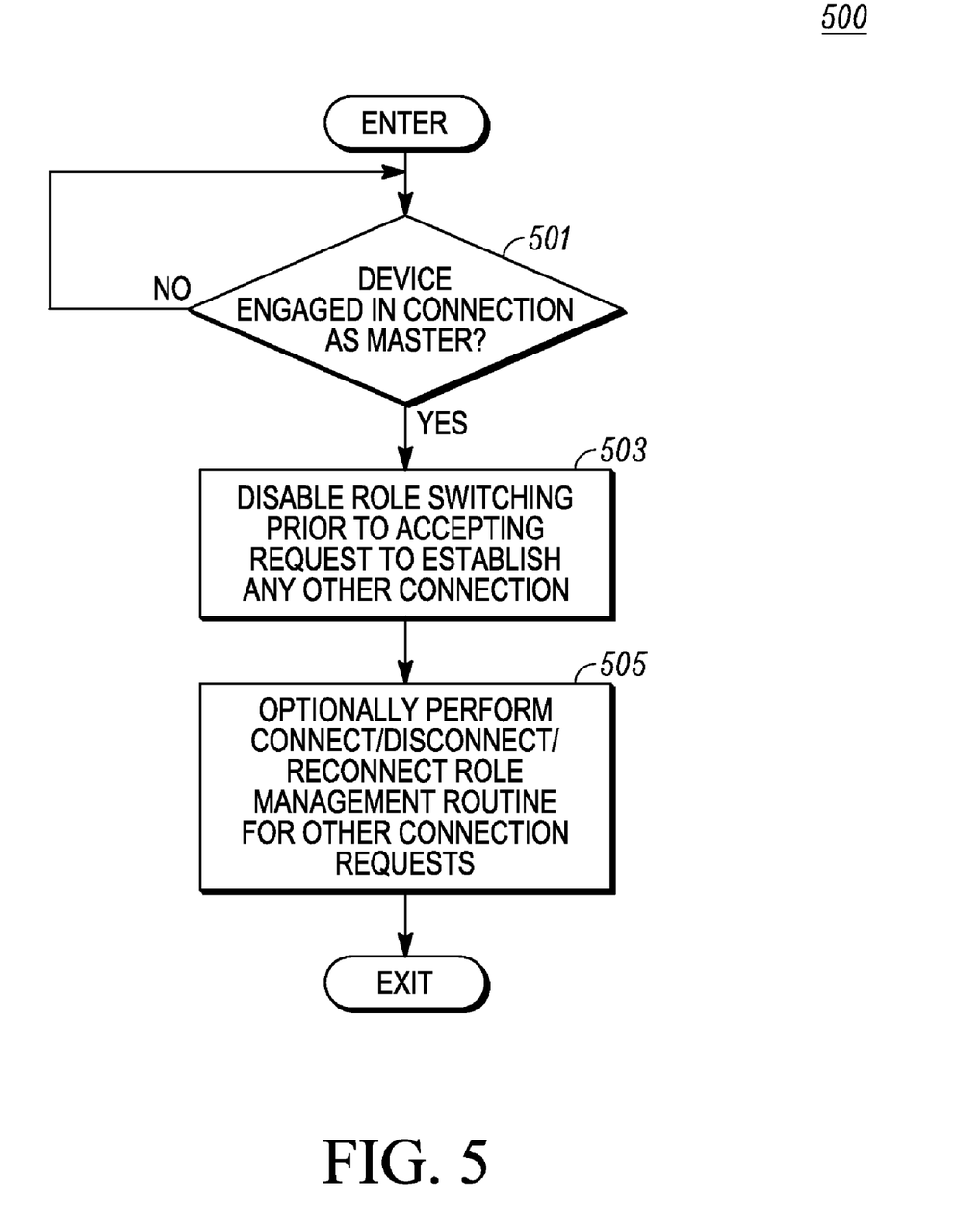
FIG. 5 is a logic flow diagram of steps executable by a wireless device to perform role management of short-range wireless connections involving the wireless device, in accordance with yet another exemplary embodiment of the present invention.

FIG. 5 is a logic flow diagram 500 of steps executable by a wireless device 101 to perform role management of short-range wireless connections involving the wireless device 101, in accordance with another exemplary embodiment of the present invention. The steps of the logic flow diagram 500 are preferably implemented as a set of operating instructions 114 (software) stored in memory 113 of the wireless device 101 and executed by one or more processors 111 of the wireless device 101. According to this embodiment, the wireless device 101 engages in a short-range wireless connection with a second wireless device (e.g., wireless device 102) such that the wireless device 101 performs a master role with respect to the connection. The connection occurs over a short-range wireless link (e.g., wireless link 105) that supports a short-range wireless protocol, such as Bluetooth. The wireless device 101 may have become master of the connection by default (e.g., by being the requestor of the connection under the Bluetooth protocol specification) or through role switching.

Some time after determining (501) that the wireless device 101 is engaged in a connection with the second wireless device 102 as the master of that connection, the wireless device 101 disables (503) its role switching functionality prior to accepting a request to establish a connection with a third wireless device (e.g., wireless device 103) over another short-range wireless link (e.g., wireless link 107). The wireless link 107 for the new connection supports the same short-range wireless protocol as the wireless link 105 being used for the connection between the wireless device 101 and the second wireless device 102. Thus, in this embodiment, disablement of the wireless device's role switching functionality occurs only after the wireless device 101 becomes engaged in a short-range wireless connection. Disablement of role switching prevents the wireless device 101 from switching to a slave role with respect to the connection with the second wireless device 102. Keeping the wireless device 101 in the master role with respect to connections with other wireless devices 102, 103 (especially wireless devices that function as auto gateways) is important for reducing the likelihood of multi-connection scatternet formation and the abnormal link loss associated therewith, as well as for saving the battery life of the wireless device 101 as a result of performing fewer link management transmissions than if the wireless device 101 was performing in slave roles with respect to the connections.

After disabling role switching, the wireless device 101 may receive connection requests from other wireless devices, such as wireless device 103, and optionally perform (505) the connect/disconnect/reconnect role management routine disclosed above with respect to FIG. 4 for such connection requests so as to keep the wireless device 101 in the master role when the wireless device 101 is involved in two or more simultaneous short-range wireless connections. For example, if the wireless device 101 receives a request from another wireless device 103 to establish a connection over short-range wireless link 107 while the wireless device 101 is the master of an ongoing connection with wireless device 102 over short-range wireless link 105, the wireless device 101 may accept the connection request such that the wireless device 101 temporarily performs a slave role with respect to the connection over link 107. The wireless device 101 may then initiate a disconnect of the connection with wireless device 103 (e.g., before exchanging audio or other payload information with wireless device 103 over link 107) and communicate a request to wireless device 103 to establish a new short-range wireless connection over wireless link 107, which places wireless device 101 in the master role for the new connection by default (e.g., in accordance with the Bluetooth protocol). If wireless device 103 accepts the new connection request, the wireless device 101 receives an acceptance message from wireless device 103 and establishes the new connection over wireless link 107 such that the wireless device 101 performs the master role with respect to the new connection.

The present invention encompasses a method and apparatus for performing role management of short-range wireless connections. With this invention, wireless devices, such as Bluetooth accessory devices, may operate as the master of all their short-range wireless connections, thereby reducing the likelihood of abnormal link loss when there are multiple audio links between the accessory device and audio gateway devices. By acting as the master of its connections, especially its audio connections, the accessory device can focus on receiving and transmitting information packets without also having to make periodic transmissions for link management purposes. The absence of link management transmissions also reduces accessory device current drain and improves battery standby time.

As detailed above, embodiments of the present invention reside primarily in combinations of method steps and/or apparatus components related to performing role management of short-range wireless connections. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual such relationship or order between such entities or actions. The terms "comprises," "comprising," "includes," "including," "has," "having," "contains," "containing," and any other variations thereof are intended to cover a non-exclusive inclusion, such that a process, method, article, or apparatus that comprises, includes, has, or contains a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the wireless devices 101-103 described herein may be comprised of one or more conventional processors and unique stored program instructions that control the processors to implement, in conjunction with certain non-processor circuits, some, most, or all of the functions of the wireless devices 101-103 and their operational methods as described herein. The non-processor circuits may include, but are not limited to, storage devices (e.g., memory), batteries or other power sources, filters, clock circuits, and various other non-processor circuits. As such, the functions of these non-processor circuits may be interpreted as steps of a method to perform role management of short-range wireless connections. Alternatively, some or all functions could be implemented by a state machine that has no stored program instructions, or in one or more application specific integrated circuits (ASICs), in which each function or some combinations of certain of the functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the appended claims. For example, while the above discussion of operation of the present invention has focused on implementation in a wireless accessory device, those skilled in the art will readily appreciate that the present invention may be readily implemented in and practiced by any other wireless device that may need to mange its role in short-range wireless connections. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for a first wireless device to perform role management of short-range wireless connections involving the first wireless device, the method comprising:
    accepting a request from a second wireless device to establish a connection over a short-range wireless link such that the first wireless device temporarily performs a slave role with respect to the connection, wherein the short-range wireless link supports a short-range wireless protocol and wherein the first wireless device supports role switching with respect to connections involving the first wireless device;
    responsive to establishing the connection, initiating a disconnect of the connection;
    subsequent to disconnecting the connection, communicating a second request to the second wireless device to establish a new connection over the short-range wireless link;
    receiving an acceptance of the second request from the second wireless device;
    establishing the new connection over the short-range wireless link such that the first wireless device performs a master role with respect to the new connection;
    disabling role switching functionality of the first wireless device prior to accepting the request to establish the connection.

2. The method of claim 1, wherein a disconnect of the connection is initiated prior to communication of audio between the first wireless device and the second wireless device over the short-range wireless link.

3. The method of claim 1, wherein prior to accepting the request from the second wireless device, the first wireless device is engaged in a second connection with a third wireless device over a second short-range wireless link such that the first wireless device performs a master role with respect to the second connection, wherein the second short-range wireless link supports the short-range wireless protocol, and wherein disablement of the role switching functionality prevents switching of the first wireless device from the master role to a slave role with respect to the second connection.

4. The method of claim 1, wherein the short-range wireless protocol is a Bluetooth protocol.

5. The method of claim 1, further comprising:
prior to accepting the request from the second wireless device, engaging in a second connection with a third wireless device over a second short-range wireless link such that the first wireless device performs a master role with respect to the second connection, wherein the second short-range wireless link supports the short-range wireless protocol.

6. The method of claim 5, wherein the connection and the second connection occur in different short-range coverage areas.

7. A method for a first wireless device to perform role management of short-range wireless connections involving the first wireless device, the first wireless device supporting role switching with respect to the short-range wireless connections, the method comprising:
engaging in a first connection with a second wireless device over a first short-range wireless link such that the first wireless device performs a master role with respect to the first connection, wherein the first short-range wireless link supports a short-range wireless protocol; and
disabling role switching functionality of the first wireless device prior to accepting a request to establish a second connection with a third wireless device over a second short-range wireless link such that the first wireless device does not switch from the master role to a slave role with respect to the first connection, wherein the second short-range wireless link supports the short-range wireless protocol.

8. The method of claim 7, further comprising:
accepting the request from the third wireless device to establish the second connection over the second short-range wireless link such that the first wireless device temporarily performs a slave role with respect to the second connection;
responsive to establishing the second connection, initiating a disconnect of the second connection prior to communication of audio between the first wireless device and the third wireless device over the second short-range wireless link;
subsequent to disconnecting the second connection, communicating a second request to the third wireless device to establish a new connection over the second short-range wireless link;
receiving an acceptance of the second request from the third wireless device; and
establishing the new connection over the second short-range wireless link such that the first wireless device performs a master role with respect to the new connection.

9. The method of claim 8, wherein the first connection and the second connection occur in different short-range coverage areas.

10. A wireless device operable to perform role management of short-range wireless connections involving the wireless device, the wireless device comprising:
a transceiver operable to support communications over a plurality of short-range wireless links, wherein the plurality of short-range wireless links support a short-range wireless protocol;
memory operable to store wireless device operating instructions; and
a processor operably coupled to the transceiver and the memory, the processor operable in accordance with the wireless device operating instructions to:
accept a request from a second wireless device to establish a connection over a short-range wireless link of the plurality of short-range wireless links such that the processor temporarily performs a slave role with respect to the connection;
initiate a disconnect of the connection responsive to establishing the connection;
communicate a second request to the second wireless device to establish a new connection over the short-range wireless link;
receive an acceptance of the second request from the second wireless device; and
establish the new connection over the short-range wireless link such that the processor performs a master role with respect to the new connection,
wherein the wireless device operating instructions include instructions to support role switching with respect to connections involving the wireless device, the processor being further operable to disable role switching functionality of the wireless device prior to accepting the request to establish the connection.

11. The wireless device of claim 10, wherein the processor is further operable to:
initiate the disconnect of the connection prior to communication of any audio between the wireless device and the second wireless device over the short-range wireless link.

12. The wireless device of claim 10, wherein prior to acceptance of the request from the second wireless device, the wireless device is engaged in a second connection with a third wireless device over a second short-range wireless link of the plurality of short-range wireless links such that the wireless device performs a master role with respect to the second connection, and wherein disablement of the role switching functionality prevents switching of the wireless device from the master role to a slave role with respect to the second connection.

13. The wireless device of claim 10, wherein the processor is further operable to:
prior to accepting the request from the second wireless device, engage the wireless device in a second connection with a third wireless device over a second short-range wireless link of the plurality of short-range wireless links such that the wireless device performs a master role with respect to the second connection.

14. The wireless device of claim 10, wherein the short-range wireless protocol is a Bluetooth protocol.

15. The wireless device of claim 10, wherein the wireless device is a hands-free accessory for a wide area wireless device.

16. The wireless device of claim 15, wherein the hands-free accessory is one of a headset, an, a hands-free car kit, and a personal navigation device.

17. A wireless device operable to perform role management of short-range wireless connections involving the wireless device, the wireless device comprising:
a transceiver operable to support communications over a plurality of short-range wireless links, wherein the plurality of short-range wireless links support a short-range wireless protocol;
a memory operable to store wireless device operating instructions, wherein the wireless device operating instructions include instructions to support role switching with respect to connections involving the wireless device; and a processor operably coupled to the transceiver and the memory, the processor operable in accordance with the wireless device operating instructions to:
- engage in a first connection with a second wireless device over a first short-range wireless link of the plurality of short-range wireless links such that the processor performs a master role with respect to the first connection; and
- disable role switching functionality of the wireless device prior to accepting a request to establish a second connection with a third wireless device over a second short-range wireless link plurality of short-range wireless links such that the processor does not switch from the master role to a slave role with respect to the first connection.

18. The wireless device of claim 17, wherein the processor is further operable to:
- accept the request from the third wireless device to establish the second connection over the second short-range wireless link such that the processor temporarily performs a slave role with respect to the second connection;
- responsive to establishing the second connection, initiate a disconnect of the second connection prior to communication of audio between the wireless device and the third wireless device over the second short-range wireless link;
- subsequent to disconnecting the second connection, communicate a second request to the third wireless device to establish a new connection over the second short-range wireless link;
- receive an acceptance of the second request from the third wireless device; and
- establish the new connection over the second short-range wireless link such that the processor performs a master role with respect to the new connection.

* * * * *